United States Patent [19]

Levine et al.

[11] Patent Number: 5,123,104
[45] Date of Patent: Jun. 16, 1992

[54] METHOD AND APPARATUS FOR CONCURRENT MODIFICATION OF AN INDEX TREE IN A TRANSACTION PROCESSING SYSTEM UTILIZING SELECTIVE INDICATION OF STRUCTURAL MODIFICATION OPERATIONS

[75] Inventors: Frank E. Levine, Austin, Tex.; Chandrasekaran Mohan, San Jose, Calif.

[73] Assignee: International Business Machines Corporation, Armonk, N.Y.

[21] Appl. No.: 179,190

[22] Filed: Apr. 8, 1988

[51] Int. Cl.⁵ .......................................... G06F 15/413
[52] U.S. Cl. .................... 395/600; 364/282.1; 364/282.3; 364/283.2; 364/DIG. 1; 395/800
[58] Field of Search ...................... 364/200, 300, 900; 395/800, 600

[56] References Cited

U.S. PATENT DOCUMENTS

| | | | |
|---|---|---|---|
| 4,318,184 | 3/1982 | Millett et al. | 364/900 |
| 4,468,728 | 8/1984 | Wang | 364/200 |
| 4,479,196 | 10/1984 | Ferrer et al. | 364/900 |
| 4,507,751 | 3/1985 | Gawlick et al. | 364/900 |
| 4,606,002 | 8/1986 | Waisman et al. | 364/200 |
| 4,611,298 | 9/1986 | Schuldt | 364/900 |
| 4,627,019 | 12/1986 | Ng | 364/900 |
| 4,698,752 | 10/1987 | Goldstein et al. | 364/200 |
| 4,704,703 | 11/1987 | Fenwick | 364/900 |
| 4,823,310 | 4/1989 | Grand | 364/900 |
| 4,868,744 | 9/1989 | Reinsch et al. | 364/280.3 |
| 4,878,167 | 10/1989 | Kapulka et al. | 364/200 |
| 4,914,569 | 4/1990 | Levine et al. | 364/200 |
| 4,945,474 | 7/1990 | Elliot et al. | 364/200 |

FOREIGN PATENT DOCUMENTS 62-206628 9/1987 Japan .

OTHER PUBLICATIONS

Lehman, P. L. and Yao, S. B., "Efficient Locking for Concurrent Operations on B-Trees", *ACM Transactions on Database Systems*, vol. 6, No. 4, Dec. 1981, pp. 650–670.

Primary Examiner—Thomas C. Lee
Assistant Examiner—William M. Treat
Attorney, Agent, or Firm—Andrew J. Dillon

[57] ABSTRACT

A method and apparatus for concurrent modifications of an index tree in a transaction processing system. The index tree includes at least one root node having a key record reference to one or more nodes in a next lower ordered level and at least one bottom node providing access to key records. Transactions including a structure modification operation are performed by traversing the index tree to the selected node and then setting an indication of the pendency of a structure modification operation. Concurrent key record inserts or deletes are permitted throughout the index tree where no indication of a pending structure modification operation is present and are delayed where a pending structure modification operation is indicated. Similarly, transactions which include a key record delete may require a structure modification operation in the event the transaction does not reach new point of consistency and must be undone. Therefore, an indication of each key record delete which has not yet reached a new point of consistency is set and concurrent key record inserts or deletes are also delayed until the possibility of a structure modification operation is completed.

18 Claims, 10 Drawing Sheets

METHOD AND APPARATUS FOR CONCURRENT MODIFICATION OF AN INDEX TREE IN A TRANSACTION PROCESSING SYSTEM UTILIZING SELECTIVE INDICATION OF STRUCTURAL MODIFICATION OPERATIONS

BACKGROUND OF THE INVENTION

1. Technical Field

This invention relates in general to data processing methods and devices and more specifically in its illustrated embodiment to a method and apparatus for database management of records.

2. Background Art

Database management or transaction processing systems are well known in the prior art. These systems are generally utilized to provide rapid access to database tables which contain a plurality of data records. A relational transaction processing system provides access to multiple database tables where elements of one database table are generally related to elements in another database table. A relational database allows a user to search, access, and alter data contained in multiple database tables using one or more specific elements or fields.

One important aspect of all such database systems is the ability of the system to provide rapid and efficient access to individual records in each database. Recently, database management systems have been provided which support the utilization of the database by multiple users simultaneously, allowing users to access specific data concurrently.

An index file is commonly used by database management programs to provide quick and efficient access to records in tables. These index files are commonly configured in a B-Tree structure. A reference that discusses the B-Tree is "Efficient Locking For Concurrent Operation on B-Tree" by Lehman and Yao, *ACM Transactions on Database Systems*, volume 6, number 4, December, 1981, pages 650-670. Other references addressing B-Tree structures include "The Ubiquitous B-Tree" by Comer, *Computing Surveys*, volume 11, number 2, June, 1979. pages 121-137; and "Concurrent Operation on B-Trees with Over Taking" by Sagiv, *Proceedings ACM SIGACT-SIGMOD Symposium on Principles of Database Systems*, March, 1985, pages 28-37.

The index file configured as a B-Tree structure consists of a root node with many levels of nodes branching from the root node. The information contained in these nodes include pointers to the nodes at the next level or pointers to records in the database. These pointers include further information termed key record information which may reference the records in the database. The record keys are in an ordered form throughout the nodes. For example, an index tree may exist for an alphabetic listing of employee names. The root node would include reference keyed data that relates to records indirectly or directly referenced by the next level of nodes. The reference keys contain information about the index filed, i.e. the alphabetic . spelling of employees name. Therefore, the ordered keys in the root node would point to the next successive level of nodes. In other words, the next successive node may indirectly or directly reference all employees names beginning with A, B, and C. A next successive node, parallel with the first successive node, may contain employee records whose last name begins with the letters D-M. The last successive node on this level would reference records of employees with last names starting with N-Z. As one searches through the index file tree. a bottom node is eventually reached. The contents of the bottom node include record keys that point to the individual records in storage.

One problem in providing concurrent accesses to database tables occurs when multiple transactions are trying to access a record at the same time. Specifically, when one user wishes to change a record and another user is attempting to access this record, a contention situation occurs. One solution to the contention problem is to provide exclusive access (or locking) to the records or to the portions of the B-Tree indexes to ensure that the index node, or record is not changed while the user is attempting to access it. Locking is addressed in "Index Locking and Splitting", *IBM Technical Disclosure Bulletin*, volume 25, number 7B, December, 1982, pages 3725-3729; and "Locking Protocols for Concurrent Operations on B-Trees", *IBM Technical Disclosure Bulletin*, volume 19, number 10, March, 1977, pages 3887-3889. The disadvantage of a locking solution is that a lock, while providing access to one user, prevents access by any other user. It should therefore be apparent to those skilled in the art that by minimizing the number of locks utilized it will be possible to enhance the concurrency of a system.

Another important aspect of data processing systems is the capability of such systems to make changes to the data contained within the database in a recoverable manner. That is, these systems ensure that either all of the changes entered by a particular user persists or none of the changes persist in the event the operation of the system is interrupted by failures of various components. Similarly, the user also is given the ability to request that changes the user has made to the database be reversed until a particular point in time has been reached. Thus, the users' changes to the database are said to be "recoverable." This concept is incorporated into database systems which operate in a "transaction" processing manner. A transaction is a logical unit of work comprised of a sequence of operations which transforms a first consistent state of a recoverable database resource into another consistent state without necessarily preserving consistency at all intermediate points in the sequence. The utilization of a transaction processing system will guarantee that if a transaction executes certain updates against a recoverable database resource, and a failure occurs before the transaction reaches its normal termination or an interim point of consistency, then those updates will be undone.

Since a transaction includes the execution of an application-specified sequence of operations, its existence in the system is generally initiated with a special "BEGIN WORK" operation and ends with either a "COMMIT" or an "ABORT". The COMMIT and ABORT operations previously described provide atomicity in the system in that the COMMIT operation signifies that a new point of consistency has been reached and all updates made by the transaction involved must be made permanent. The ABORT operation signifies that a fault has occurred and that any changes made by the particular transaction involved must be "rolled back" or undone, and the recoverable database resources returned to the prior point of consistency.

In order to permit this transaction recovery guarantee, the database system must be able to remember across system outages those transactions which were in progress and the state of their update actions so that the effect of those actions on recoverable data may be properly reflected when the system is restarted. This is accomplished by recording in a log stored on stable storage the progress of each transaction from its beginning to its end, and those actions which cause changes to recoverable data resources. This log then becomes a source for ensuring that the transaction's committed actions are reflected, or that its uncommitted actions are reversed to ensure that the database stays consistent. When the log of transaction operations reflects data object content these log records also become the source for reconstruction of damaged or lost data. These systems generally assign each log record a unique log sequence number (LSN) at the time the record is written into the log. Such LSNs are generally assigned in an ascending numerical sequence. Upon the completion of the logging of an update to a page of memory in the database the LSN of the log record corresponding to the update is also typically stored on that page.

The type of system described above is generally referred to as a log write-ahead system. A log write-ahead system requires that a log entry corresponding to a particular operation must by physically written to stable storage before new versions of the changed data replace the earlier versions of the data on non-volatile storage. Stable storage, as described herein means non-volatile storage which remains intact and available across system failures. One such example is the utilization of a magnetic storage disk. Additionally, such systems store transaction status in the log and no transaction may be considered complete until its committed status and all of its log data is safely recorded on stable storage. Thus, in the event of a system failure, a restart procedure will recover any operations within the transaction which were completed successfully but did not manage to get their updated resources physically written to stable storage prior to the system failure. Further, such systems do not permit a transaction to complete COMMIT processing until all portions of all log records for the transaction have been written to the physical log.

SUMMARY OF THE INVENTION

It is therefore one object of the present invention to provide a more efficient method of accessing records in a database through an index tree.

It is another object of the present invention to provide a more efficient method of accessing records in a database through an index tree while providing more efficient concurrent access by multiple users to the database.

It is yet another object of the present invention to provide a more efficient method of accessing records in a database through an index tree which permits data to be accessed without having to traverse the tree a second time in the event of a delay in access due to a structure modification to the tree.

The foregoing objects are achieved as is now described. A method and apparatus are provided for concurrent modifications of an index tree in a transaction processing system. The index tree includes at least one root node having a key record reference to one or more nodes in a next lower ordered level and at least one bottom node providing access to key records. Transactions including a structure modification operation are performed by traversing the index tree to the selected node and then setting an indication of the pendency of a structure modification operation. Concurrent key record inserts or deletes are permitted throughout the index tree where no indication of a pending structure modification operation is present and are delayed where a pending structure modification operation is indicated. Similarly, transactions which include a key record delete may require a structure modification operation in the event the transaction does not reach a new point of consistency and must be undone. Therefore, an indication of each key record delete which has not yet reached a new point of consistency is set and concurrent key record inserts are also delayed until the possibility of a structure modification operation is completed. Once a structure modification operation is complete, a log record is written which will prevent the undoing of the structure modification operation in the event of a system failure, whether or not the transaction containing the structure modification operation has reached a new point of consistency. In one preferred mode of the present invention, the local node is researched after a delay to determine if key insertion or deletion is possible without the necessity of traversing the tree a second time.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
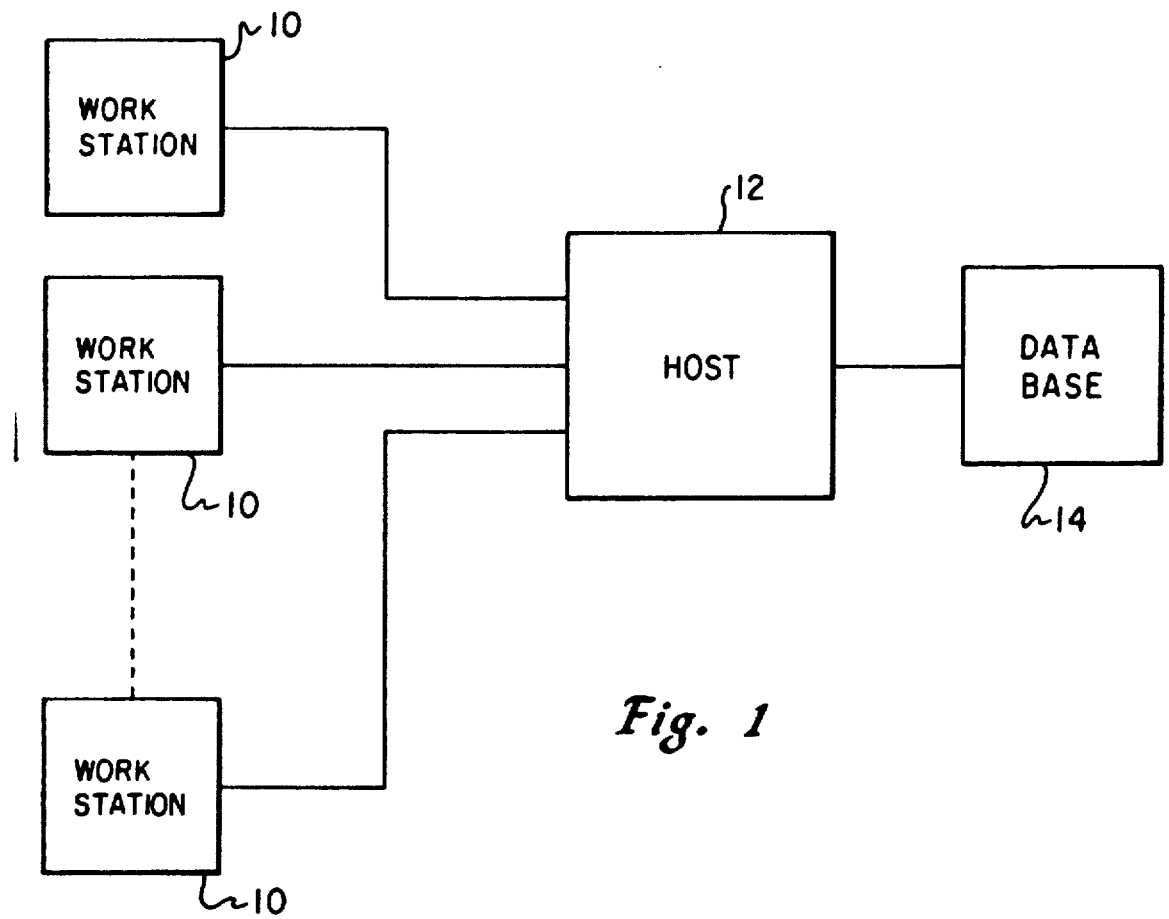
FIG. 1 is a block diagram of a concurrent access database system in accordance with the present invention.

With reference now to the Figures and in particular with reference to FIG. 1, there is depicted a block diagram of a concurrent access database system in accordance with the present invention. As can be seen, the concurrent access database system includes a plurality of interactive work stations 10 (IWS), which are all coupled to a host processor 12. Host processor 12 is then coupled to database 14. Those skilled in the art will appreciate that while this particular embodiment is disclosed, a similar system comprised of individual computers coupled via a local area network may also be utilized. As can be seen, each operator of an interactive work station 10 may search, access, or alter records contained within database 14 by means of a database management system which is typically embodied within the host processor 12. Those skilled in this art will appreciate that database 14 is typically provided by utilizing index files, which are commonly configured in a B-Tree structure as discussed above. A typical B-Tree structure consists of at least one root node with multiple levels of nodes branching from the root node. The information contained in each node includes pointers to nodes at the next lower level or pointers to records which are contained in the database at the lowest level of nodes, often referred to as leaf nodes.

Figure 2:
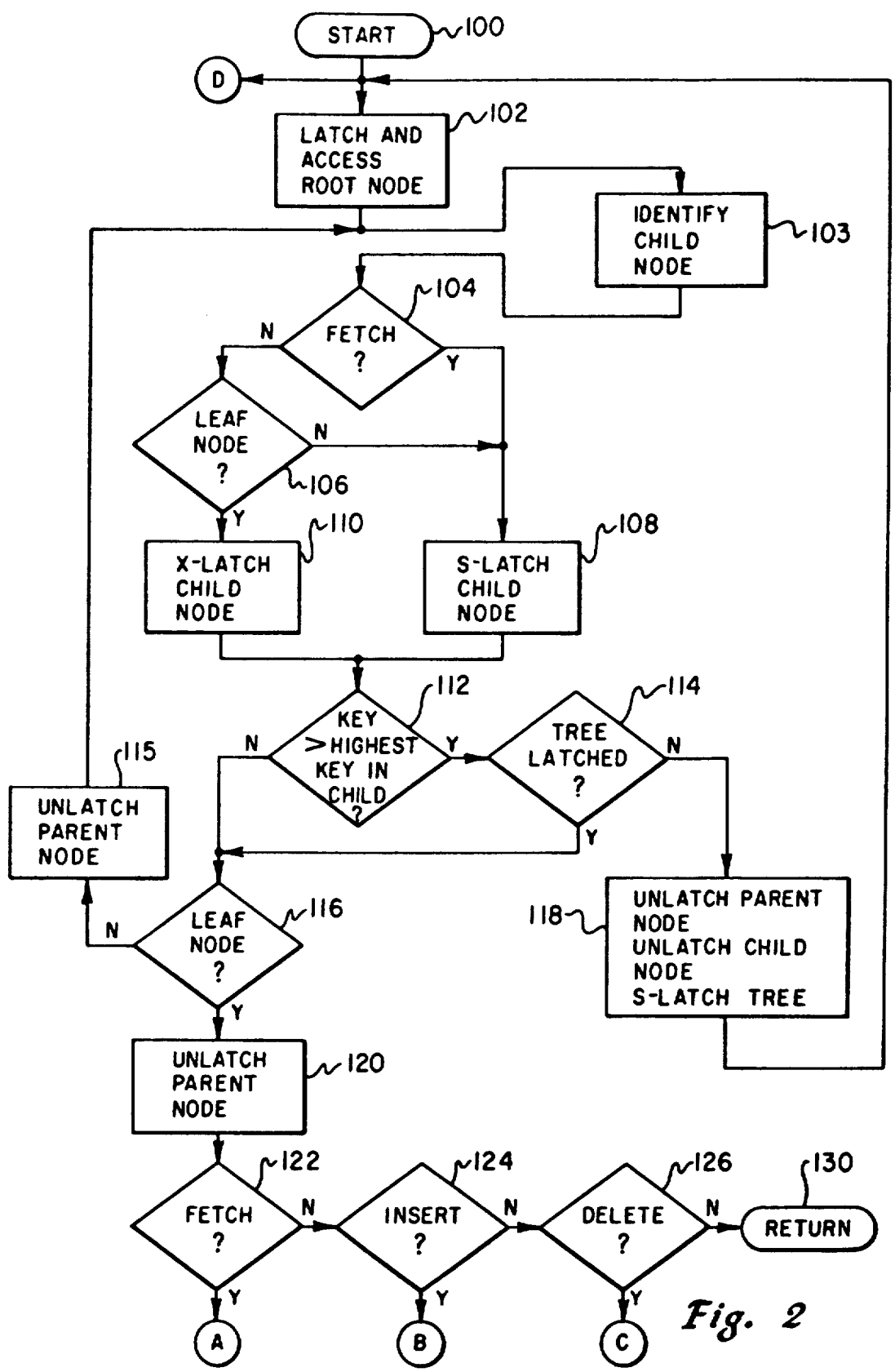
FIG. 2 is a logic flow chart illustrating an initial search operation through a database in accordance with the present invention.

With reference now to FIG. 2, there is depicted a logic flow chart which illustrates an initial search operation through a database in accordance with the present invention. As can be seen, the access program begins at step 100 and proceeds to step 102 where the index root node is S-latched and accessed. An S-latch provides limited access to other concurrent users. This limited access provides the other users with the capability to access and read the information contained within the node. No other access, such as the capability to delete or change, is provided. The index root node identifies the type of index and provides the initial direction for accessing a record in this example. For example, the index root node could identify the index as an alphabetical index in ascending order for a plurality of names. In step 103, the child node to be accessed would be identified according to the information in the parent node. As illustrated in step 104, it is next determined whether or not the operation to be performed is a fetch operation. If the operation is not a fetch operation, that is, the operation is a record insert (or key record insert), or a record delete (or key record delete) operation, the access program then proceeds to step 106 to determine if the next node beneath the parent node is a bottom node or a "leaf node". If the next node is a leaf node, the program proceeds to step-110 and acquires an X-latch on the child node. The X-latch is an exclusive latch which excludes all other accesses to this particular node. By applying an X-latch to the node in question the program prohibits all other transactions from accessing this particular node.

Returning to step 104, if the operation is a fetch operation or, returning to step 106, if the child is not a leaf node, the access program proceeds to step 108 to acquire an S-latch on the child node. The access program then proceeds to step 112 wherein it determines whether or not the key of the record being searched is greater than the highest key in the child node. Of course, those skilled in the art will appreciate that in the event the search enters an empty node then the key being searched will automatically be construed as greater than the highest key in the child node. If the key record being searched is greater than the highest key present in the child node, the program proceeds to step 114 to determine if the tree index structure is latched. If the tree is not latched, the program proceeds to step 118 where the parent and child nodes are unlatched and the tree is latched. The access program then proceeds from step 118 back to step 102 to reinitiate the operation upon the granting of the tree latch. Those skilled in the art should appreciate that optimizations are possible to reduce the number of nodes which must be accessed when the operation is re-attempted.

In this example, an X-latch on a tree is provided to indicate to all other accesses that a change in the tree structure is being made. If a tree X-latch access is in progress when a latch is attempted on the tree, the attempting access must wait until the earlier access has been completed. An S-latch on the tree is provided to indicate all other accesses that no structural changes are being made, but other accesses may concurrently access the index tree. No other changes may occur until the S-latch is released. Tree traversal may occur regardless of the existence of S-latches or X-latches. These tree traversals may include key record deletions or insertions.

In step 114, if the tree has been latched, or in step 112 if the key is not greater than the highest key contained within the child node, the program proceeds to step 116 to determine if the child node is a leaf node. If the child node is not, the program proceeds to step 115 to unlatch the parent node and then returns to step 103. However, if the child node is a leaf node, the program proceeds to step 120 to unlatch the parent and then to steps 122, 124 and 126 to determine if the operation is a fetch, an insert, or a delete operation. In the depicted embodiment, if none of these three operations are attempted, the program will return to the user as illustrated in step 130. In actual practice, this return would include an error message signifying that the operation to be performed is not identifiable by this program.

Figure 3:
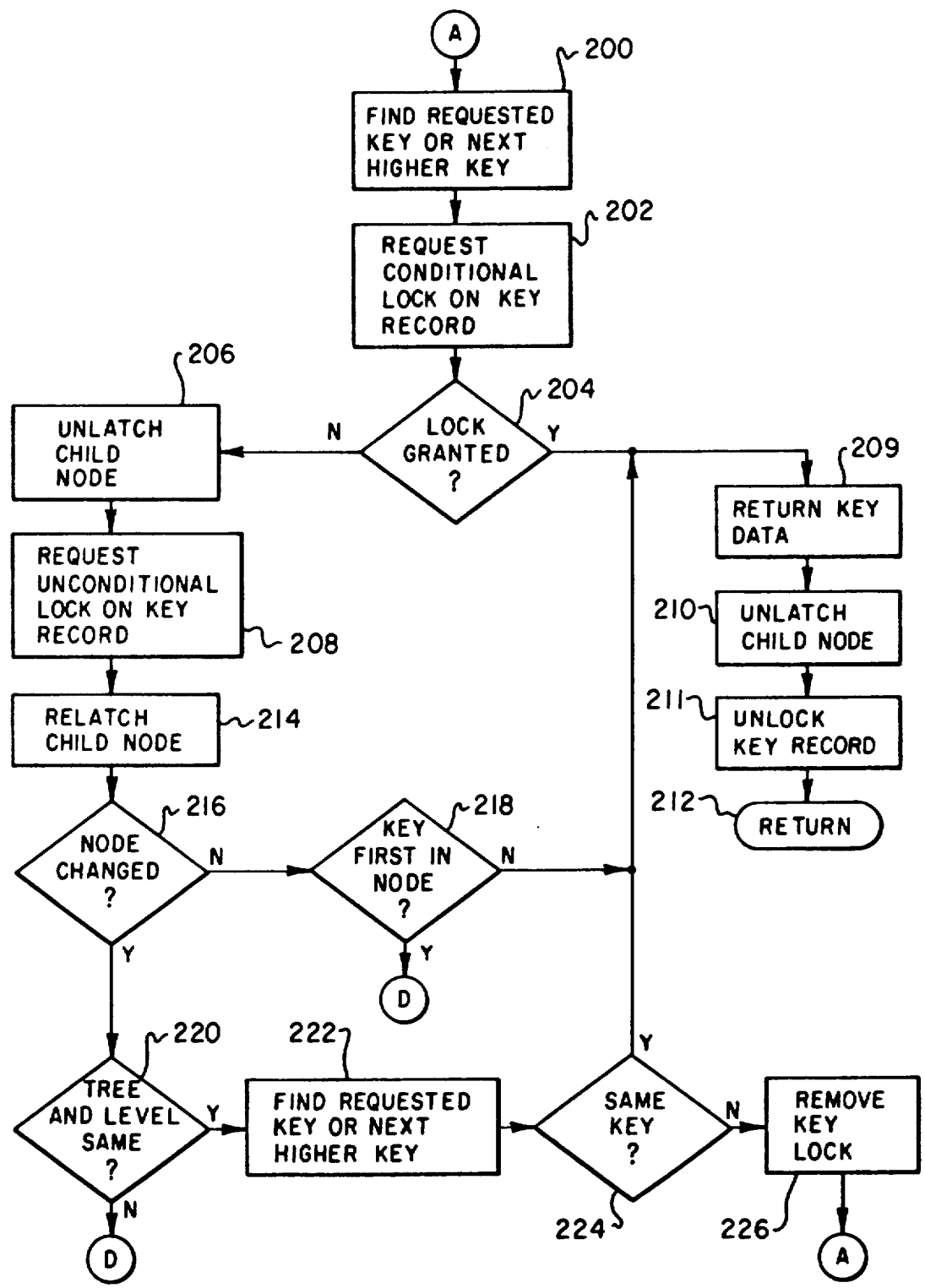
FIG. 3 is a logic flow diagram illustrating a fetch operation through a database in accordance with the present invention.

If the operation to be performed is a fetch operation, then the access program proceeds to step 200 of FIG. 3 wherein a logic flow chart is depicted which illustrates a fetch operation through a database in accordance with the present invention. In step 200 of FIG. 3, the program finds the requested key being searched or the next higher key in the database. In step 202, the program then requests a conditional lock on the key record found. In the depicted example, a conditional lock is requested from a database management program which manages the locks on the record keys. The term "conditional" means that if the lock is not immediately granted, a response will be provided to the requesting accessor indicating that such a lock is not being granted. This response is utilized to make the decision depicted in step 204. If the lock has not been granted, the program proceeds to step 206 to unlatch the child node and then to step 208 to request an unconditional lock on the key record. The request for an unconditional lock, as illustrated in step 208, requires that the accessor wait until such lock is granted before proceeding. Once the lock has been granted, the program next relatches the child node in step 214 and determines whether or not the node has changed in step 216. This examination of the node in step 216 is referred to herein as "local research" and is utilized to enhance the efficiency of the system depicted by permitting the program to proceed again from the local node rather than traverse through the tree a second time if the node has not been substantially altered. This may be determined, for example, by comparing the LSN stored at the node and the LSN recorded prior to the waiting period. If the node has not changed, step 218 then determines whether or not the key is the first key in the local node. If not, the key record found is then returned as illustrated in step 209. Thereafter, as illustrated in step 210, the child node is unlatched. In step 211, the key record is unlocked. It should be apparent to those skilled in this art that step 211 will occur when the transaction is complete or at an earlier time.

Referring again to step 218, if the key which has been located is the first key in the node the program will return to the beginning of the process illustrated in FIG. 2 to traverse the tree a second time. This is necessary due to the possibility that the key record requested was not located and that the next higher key record located was the first key in the local node. The delay which was encountered while waiting for an unconditional lock on the key record located might signify that a key record insertion has occurred at the next lower node and that the key record requested may therefore be present. In this case, it is necessary to traverse the tree a second time to determine whether or not the key record requested is present.

Referring again to step 216, if the node has been changed step 220 then determines whether or not the node is still present in the same tree and at the same level as the previous child node. If not, the tree must be traversed a second time to locate the proper child node for the key record requested. If the tree and level of the local node are the same, despite the change in the node, step 222 is utilized to find the requested key or the next higher key. Next, step 224 is utilized to determine if the program has found the same key as before. If so, the proper key record has been located and is returned via step 209 as described above. If not, the tree must be traversed a second time to find an appropriate child node. If a key does exist within the child node which is less than the key record requested, then step 226 illustrates the removal of the lock on the previously found key record and a return to step 200 to once again locate the requested key or the next higher key.

Figure 4A:
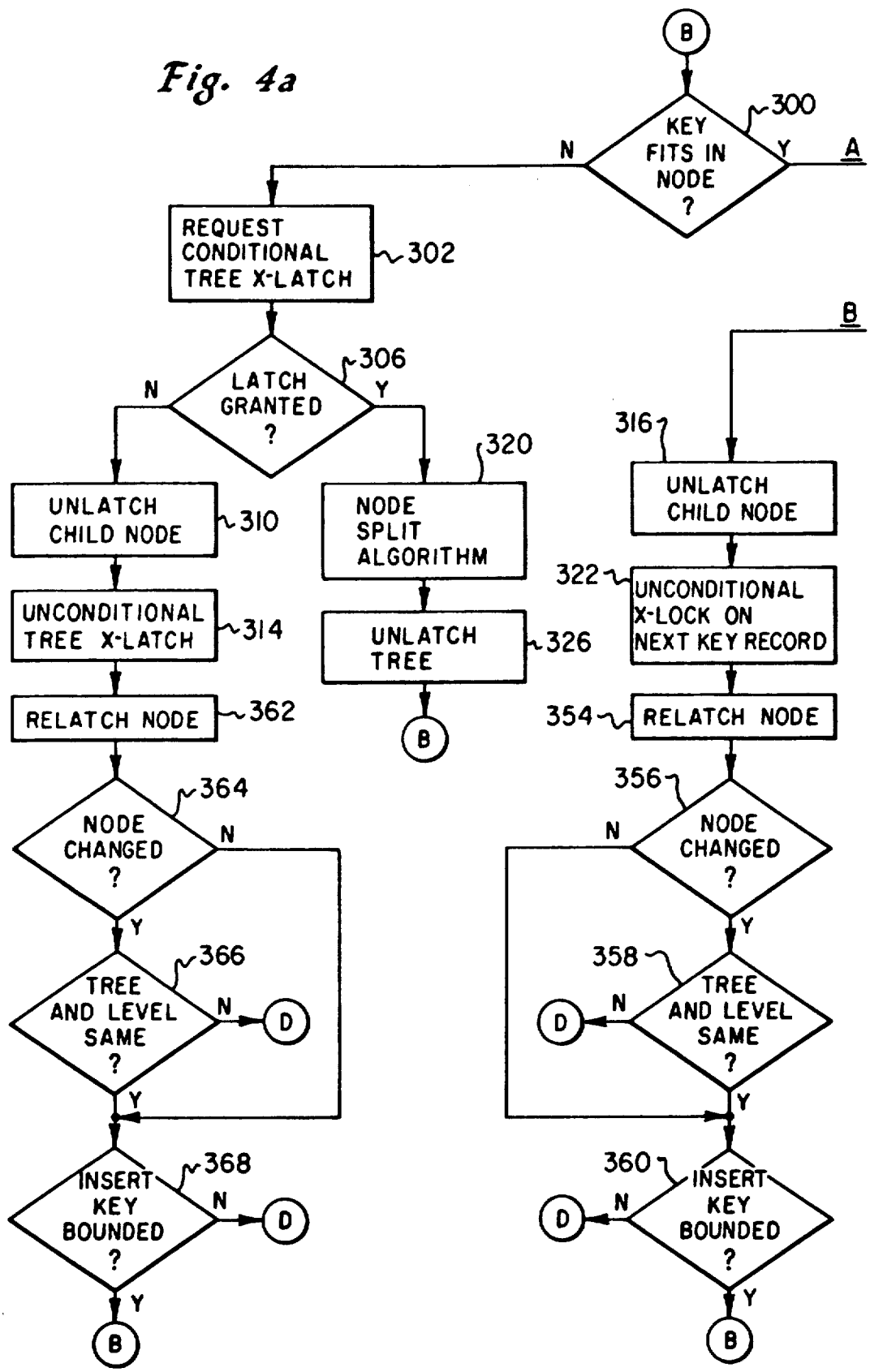
FIGS. 4A and 4B when placed together form a logic flow chart illustrating an insert operation through a database in accordance with the present invention.
Figure 4B:
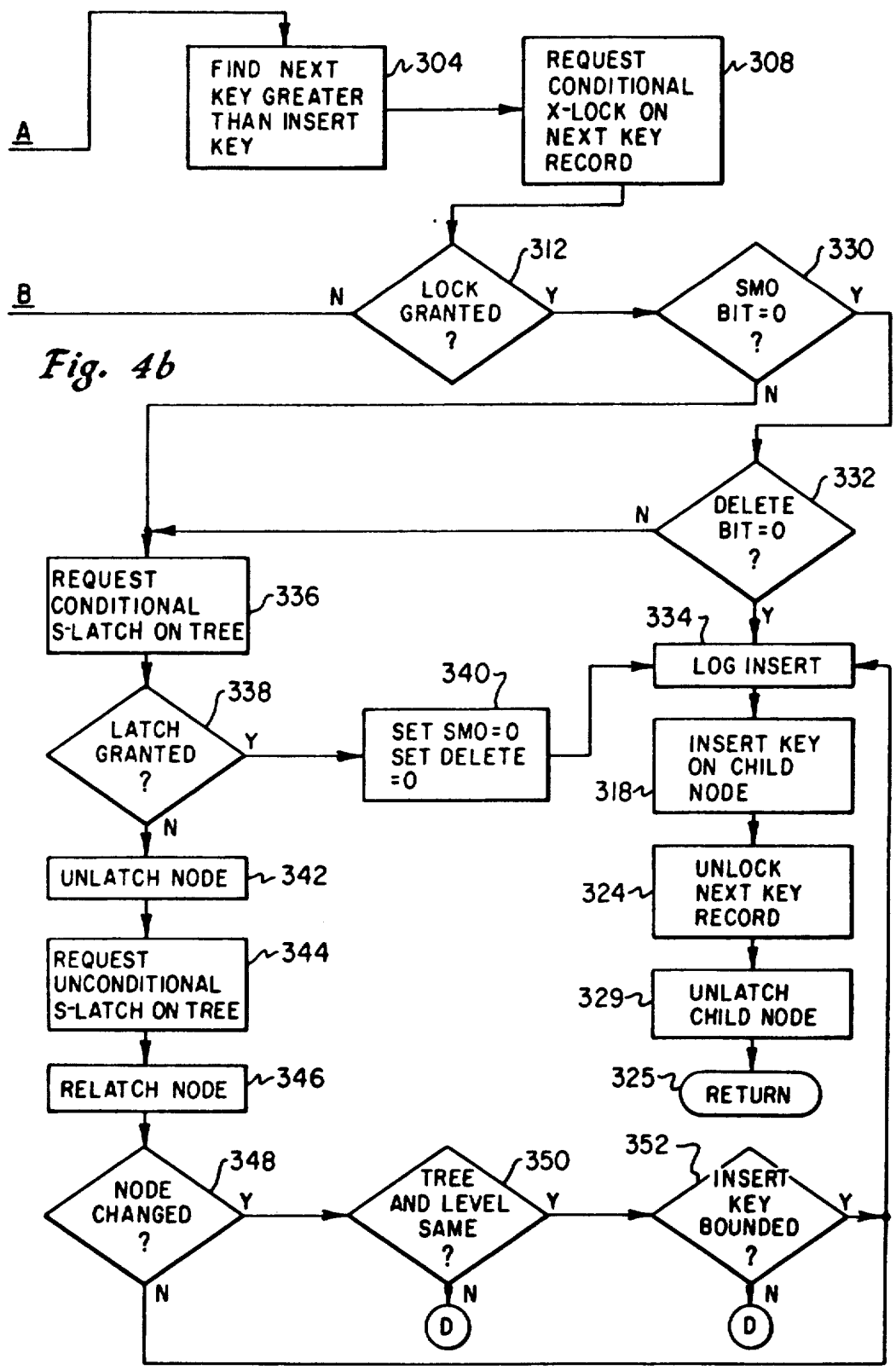

With reference now to FIGS. 4A and 4B there is depicted a logic flow chart illustrating an insert operation through a database in accordance with the present invention. It should be apparent to those skilled in this art that the key record to be inserted will be X-locked if necessary, before the insert operation begins. This operation would be utilized to insert a record in the computer memory and provide an inserted key into the index updating the respective node(s) of the index, enabling other transactions to access the newly inserted record.

In step 300, it is first determined if the key record to be inserted will fit into the bottom or leaf node. If so, the program proceeds to step 304 to find the next key which is greater than the key to be inserted. If the next key is not in the node, the access program is pointed to the next successively located leaf node. If there is no next successively located leaf node, the access program then finds the null indicator. Then, in step 308, the access program will request a conditional X-lock on the next key record. In step 312, a determination is made whether or not this conditional X-lock request has been granted. If so, step 330 is utilized to determine whether or not the SMO bit is equal to zero.

The SMO bit is a flag which is present in a leaf node which is set by the pendency of a transaction which includes a structure modification operation. In accordance with the present invention, this flag bit is utilized to delay the operation of one user while a structure modification operation of a second user is pending. Once the structure modification operation of a second user has been completed, in accordance with the present invention, that structure modification will not be undone in the event of system failure and thereafter the SMO bit will be set equal to zero.

Next, step 332 is utilized to determine whether or not the Delete bit is equal to zero. In accordance with another important feature of the present invention, a Delete bit is provided in each leaf node to indicate whether or not the node in question is participating or has participated in a delete operation which has not yet achieved a new state of consistency. This is important to realize in view of the fact that prior to achieving a state of consistency if it is necessary to UNDO a delete operation the subsequent insertion of the previously deleted record may require a node to split, if insufficient room remains in the node to reinsert the previously deleted bit. This change in the structure of the index tree may have an adverse affect upon a concurrent operation.

Therefore, if the Delete bit is equal to one, the key record operation being attempted must be delayed until a new point of consistency has been reached. If both of these conditions are met, step 334 depicts the logging of the insert operation, as is necessary in all log write-ahead systems. Thereafter, step 318 inserts the key on the child node in question. In step 324, the next record and key record are unlocked. Also, any latches which are held are released in accordance with step 329 and step 325 returns the program to the user.

Referring again to steps 330 and 332, if either the SMO bit is equal to one or the Delete bit is equal to one, indicating the pendency of a structure modification operation or the possibility that a structure modification operation may be necessary during an UNDO, the access program must request a conditional S-latch on the index tree as indicated in step 336. Step 338 indicates the determination of whether or not the latch has been granted. and if so, step 340 depicts the setting of the SMO bit and Delete bit equal to zero prior to logging the insert and performing the insert as described above with respect to steps 334 and 318.

In the event the conditional S-latch requested on the tree in step 336 is not granted, step 342 is utilized to unlatch the node and step 334 indicates the request for an unconditional S-latch on the tree. After a period of time has elapsed and the unconditional S-latch has been granted, step 346 illustrates the relatching of the node in question. Step 348 is next utilized to locally research the node to determine whether or not the node has been substantially altered. If the node has not been altered, the key record to be inserted is logged and inserted in accordance with steps 334 and 318.

In the event the node previously found has been substantially altered, step 350 is utilized to determine whether or not the node discovered is in the same index tree and at the same level. If not, the program returns to the search operation depicted in FIG. 2 and the tree is once again traversed to determine the proper node.

In the event the node discovered has been changed but the tree and level are identical, step 352 is utilized to determine whether or not the key to be inserted is bounded on the local node. If so, there is no need to traverse the tree a second time and the insert is logged and performed in accordance with steps 334 and 318. If not, as above, the search procedure of FIG. 2 begins again to locate and identify the proper node for the key insertion.

Referring again to step 312, if the conditional X-lock on the next key record is not granted, the program proceeds to step 316 to unlatch the child node and then to step 322 to request an unconditional X-lock on the next key record. After the unconditional X-lock has been granted step 354 illustrates the relatching of the node and step 356 represents the examination of the node to determine whether or not the node has been substantially altered during the waiting period. If the node has not been altered, step 360 is utilized to determine whether or not the insert key is bounded on the node, if so, the insert is logged and performed in accordance with steps 334 and 318.

In the event the node has been altered, step 358 is utilized to determine whether or not the tree and level of the node have remained the same. If not, the search procedure depicted in FIG. 2 is reiterated to locate the appropriate node. If the tree and level of the node remain the same, step 360 is utilized to determine whether or not the key record to be inserted is bounded on the local node. If not, the search procedure of FIG. 2 is repeated as above. If the key record to be inserted is bounded on the local node the program returns to step 300 and follows the procedure enumerated above.

Returning to step 300, if the key record to be inserted will not fit into the leaf node, the program proceeds to step 302 to request a conditional X-latch on the index tree. Step 306 then determines whether or not the conditional latch has been granted. If not, the program proceeds to step 310 to unlatch the child node and then to step 314 to request an unconditional X-latch on the index tree. After the unconditional X-latch has been granted on the index tree step 362 illustrates the relatching of the node and step 364 is then utilized to examine the local node to determine whether or not the node has been altered during the waiting period.

If the node has been altered, the node split algorithm depicted step 320, which will be explained in greater detail below, is called and thereafter the tree is unlatched and the insert process returns to step 300 to insert the key record into the newly established node or the originally located node, depending upon the key value. If the node located has been altered, step 366 is utilized to determine whether or not the tree and level of the local node have remained the same. If not, as above, the program returns to the search process depicted in FIG. 2 to locate the appropriate leaf node. If the tree and level of the local node have remained the same, step 368 is utilized to determine whether or not the key record to be inserted is bounded on the local node. If not, the search procedure depicted in FIG. 2 is repeated. If the key record to be inserted is bounded on the node the program returns to step 300 and proceeds to follow the steps necessary to insert the key record.

Figure 5A:
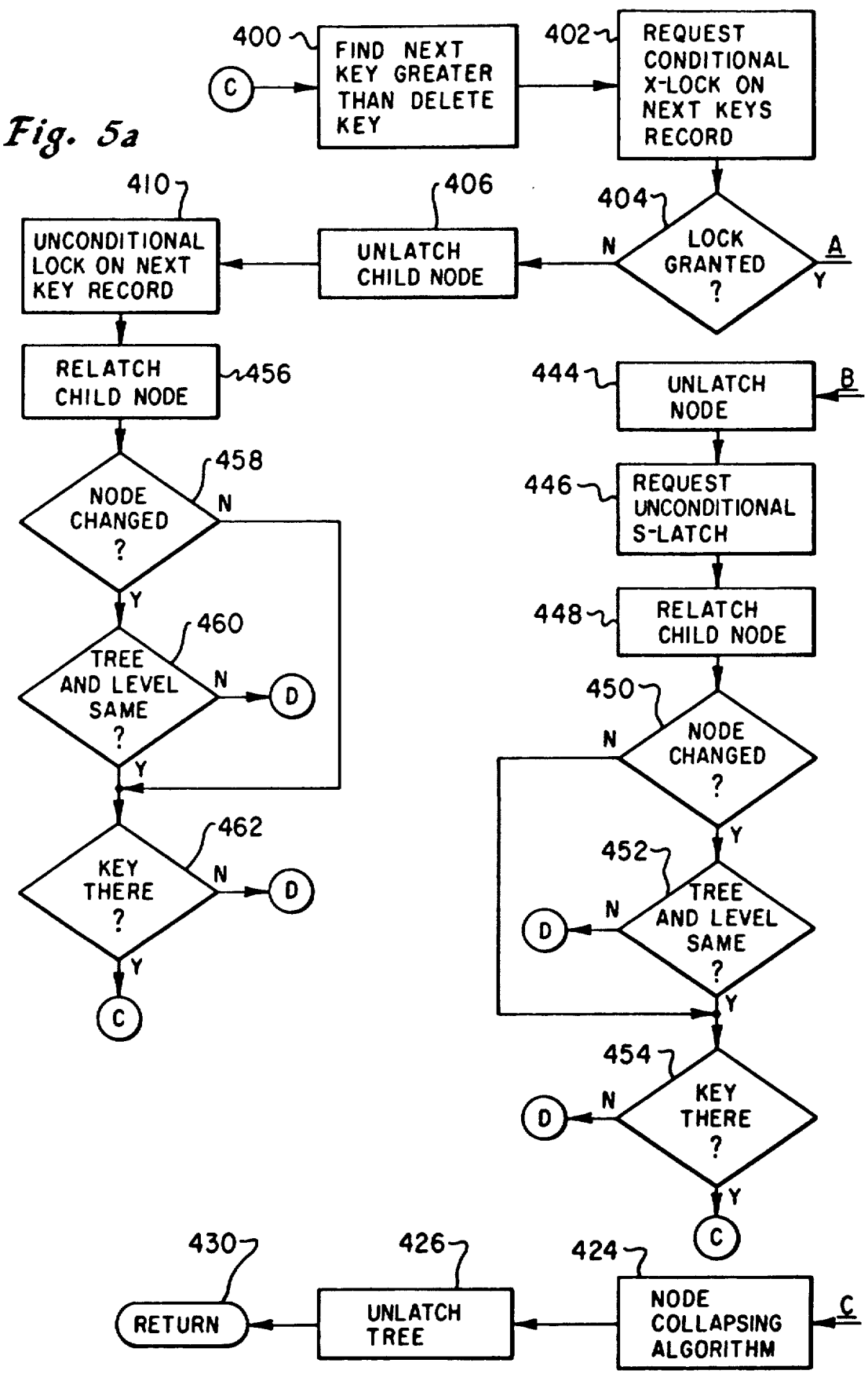
FIGS. 5A and 5B when placed together form a logic flow chart illustrating a delete operation through a database in accordance with the present invention.
Figure 5B:
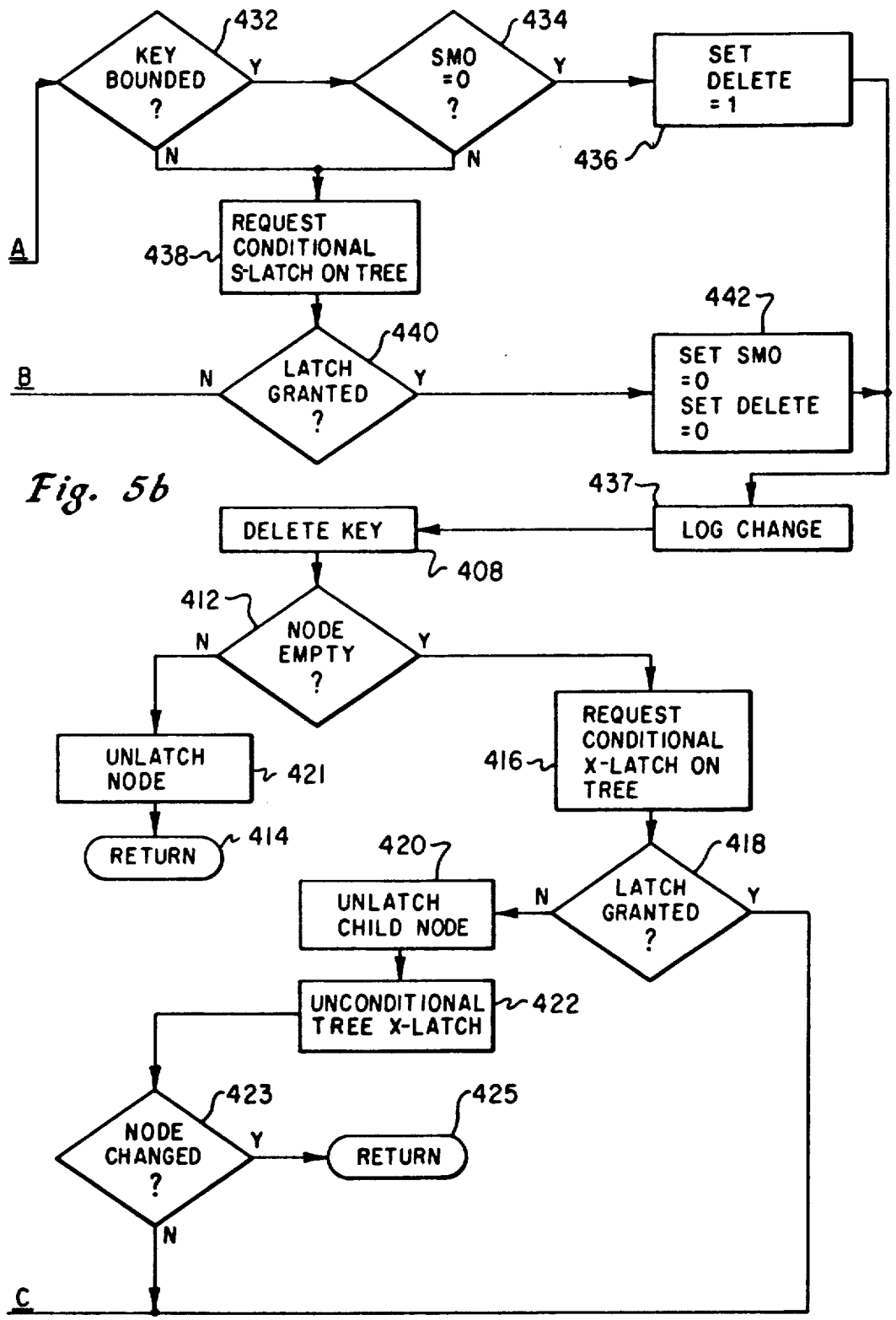

With reference now to FIGS. 5A and 5B, there is depicted a logic flow chart illustrating a delete operation through a database in accordance with the present invention. It should be apparent to those skilled in the art that the key record to be deleted will be X-locked, if necessary, before the delete operation begins. In step 400, the program finds the next key greater than the key to be deleted. In step 402 the program requests a conditional X-lock on this next record key. The program proceeds to step 404 to determine if the conditional X-lock has been granted. If the conditional X-lock requested has not been granted, the program proceeds to unlatch the child node in step 406 and then requests an unconditional lock on the next key record in step 410.

After waiting for the unconditional lock to be granted, step 456 illustrates the relatching of the child node. Thereafter, step 458 is utilized to examine the local node to determine whether or not the node has been substantially altered during the waiting period. If not, step 462 is utilized to determine whether or not the key to be deleted is still present. If so, the program returns to step 400 to begin the deletion process. If not, the search process of FIG. 2 is repeated.

If the local node has been substantially altered, step 460 is utilized to determine whether or not the tree and level of the node have remained the same. If not, the program returns to the search process depicted in FIG. 2. If the tree and level of the local node have remained the same, step 462 is utilized to determine whether or not the key to be deleted is still present within the local node. If not, the program once again returns to the search procedure depicted in FIG. 2 to locate the appropriate leaf node. However, if the key to be deleted is present in the local node, the program returns to step 400 to begin the deletion process.

Returning now to step 404, if the conditional X-lock on the next key's record has been granted, step 432 is utilized to determine whether or .not the key to be deleted is bounded on the local node. If so, step 434 is utilized to determine whether or not the SMO bit is equal to zero, indicating that the leaf node in question is not participating in a structure modification operation which has not yet completed. If the SMO bit is equal to zero, step 436 sets the Delete bit equal to one, indicating that the node in question has had a key record deleted in a transaction which has not yet reached a new point of consistency. Thereafter, the key record to be deleted is logged as illustrated in step 437 and step 408 illustrates the deletion of that key record.

In the event the key record to be deleted is not bounded on the leaf node or the SMO bit is not equal to zero, step 438 illustrates the requesting of a conditional S-latch on the index tree. In the event the latch requested has been granted, as determined by step 440, step 442 sets the SMO bit and the Delete bit equal to zero and the deletion is logged and accomplished in accordance with steps 437 and 408. If the conditional S-latch requested on the index tree is not granted, step 444 illustrates the unlatching of the node and the requesting of an unconditional S-latch on the index tree as illustrated in step 446.

After waiting for the unconditional S-latch to be granted, step 448 illustrates the relatching of the child node and step 450 again illustrates the local researching of the node to determine whether or not the node has been altered substantially during the waiting period. If not, the program returns to step 442 where the SMO bit and Delete bit are both set equal to zero and the deletion is logged and accomplished in accordance with steps 437 and 408. If the local node has been substantially altered, step 452 is utilized to determine whether or not the node is still in the same tree and at the same level. In the event the node is still present in the same tree and at the same level, step 454 is utilized to determine whether or not the key record to be deleted is present within the node. If so, the program returns to step 400 to begin the deletion process. If the local node is no longer present in the same tree or at the same level, or in the event the key record to be deleted is not present, the program returns to the search procedure depicted in FIG. 2 to determine the appropriate leaf node for the action in question.

After deleting the key record in accordance with step 408, the program then proceeds to step 412 to determine whether or not the node previously containing that key record is now empty. If not, the program unlatches the node in step 421 and returns to the operator in step 414. In contrast, in the event the node previously containing the deleted key record is empty, step 416 is utilized to request a conditional X-latch on the index tree. Next, in step 418, the program determines if the conditional latch has been granted. If so, the program proceeds to step 424 to perform the node collapsing algorithm which will be explained in greater detail below. The node collapsing algorithm removes the empty node and the references to the empty node from the preceding nodes in the index tree. Thereafter, step 426 illustrates the unlatching of the tree and returning the program to the operator in step 430.

Referring again to step 418, in the event the conditional X-latch requested on the index tree is not granted, step 420 illustrates the unlatching of the child node and the requesting of an unconditional X-latch on the tree as illustrated in step 422. After waiting for the unconditional X-latch for the index tree to be granted, step 423 then determines whether or not the node in question has been altered during this waiting period. If so, the program returns to the operator at step 425 and if not, the node collapsing algorithm and subsequent steps discussed above are accomplished.

Figure 6:
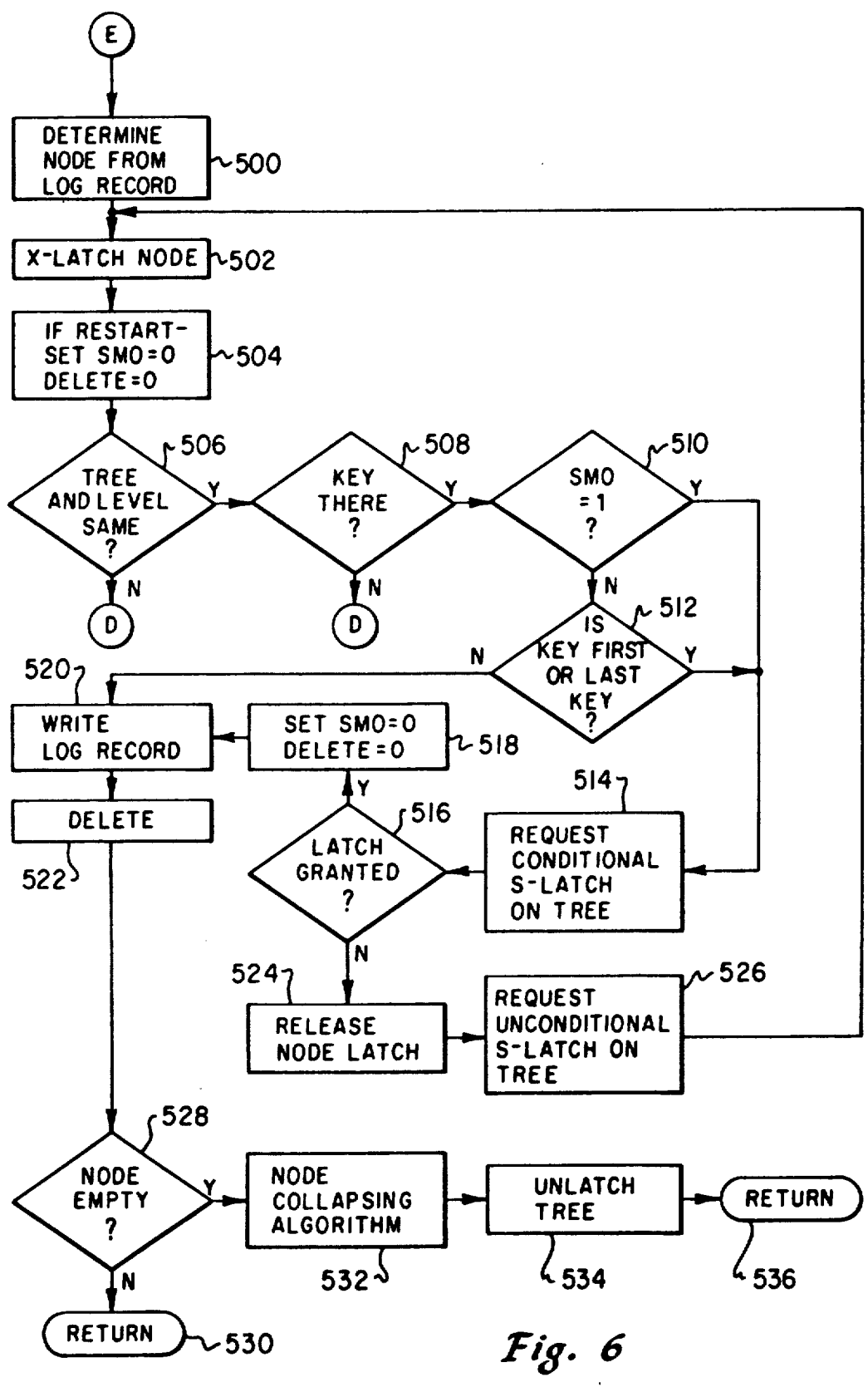
FIG. 6 is a logic flow chart illustrating an UNDO operation of a key record insert through a database in accordance with the present invention.

Referring now to FIG. 6, there is depicted a logic flow chart illustrating an UNDO operation of a key record insert through a database in accordance with the present invention. Those skilled in the art will appreciate that in the event a key record has been inserted in a transaction and a system failure has occurred prior to reaching a new point of consistency, it will be necessary to roll back or "UNDO" the key record insert. This will be the equivalent of a key record delete. As can be seen in FIG. 6, the first step in the UNDO of a key record insert is the determination of the appropriate node from the log record, as illustrated in step 500. Next, the appropriate node is X-latched, as illustrated in step 502, and step 504 is utilized to set the SMO bit and Delete bit equal to zero if the UNDO is being accomplished as a result of a restart of the system. Step 506 is then utilized to determine whether or not the node in question is present in the same tree and at the same level as prior to the system outage which caused the UNDO. Similarly, step 508 is utilized to determine whether or not the key to be deleted is present within the node. In either case, if the tree and level have varied or the key is not present, the program must return to the search procedure outlined in FIG. 2. Next, step 510 is utilized to determine whether or not the SMO bit is equal to one, indicating that the node in question is participating in a structure modification operation which is still pending. If not, step 512 illustrates the determination of whether or not the key to be deleted is the first key or last key in the node. If the SMO bit is equal to one or the key to be deleted is the first key in the appropriate node, step 514 illustrates the requesting of a conditional S-latch on the tree. Next, step 516 determines whether or not the latch has been granted and if so, step 518 depicts the setting of the SMO bit and Delete bit equal to zero.

In the event the SMO bit is not equal to one and the key to be deleted is not the first key in the appropriate node, step 520 illustrates the writing of a log record prior to accomplishing the key record delete. Thereafter, the key record is deleted as depicted in step 522 and step 528 is utilized to determine whether or not the node is now empty. If not, the program returns to the operator at step 530. If in fact the deletion of the key record has rendered the node empty, step 532 takes the program to the node collapsing algorithm and after completion of that step, such step 534 unlatches the tree and returns the program to the operator in step 536.

Returning now to step 516, if the conditional S-latch requested on the tree is not granted, step 524 depicts the releasing of the node latch and the requesting of an unconditional S-latch on the tree as illustrated in step 526. Thereafter, the program returns to step 502 to begin the UNDO of the key insert operation after the unconditional S-latch has been granted.

Figure 7:
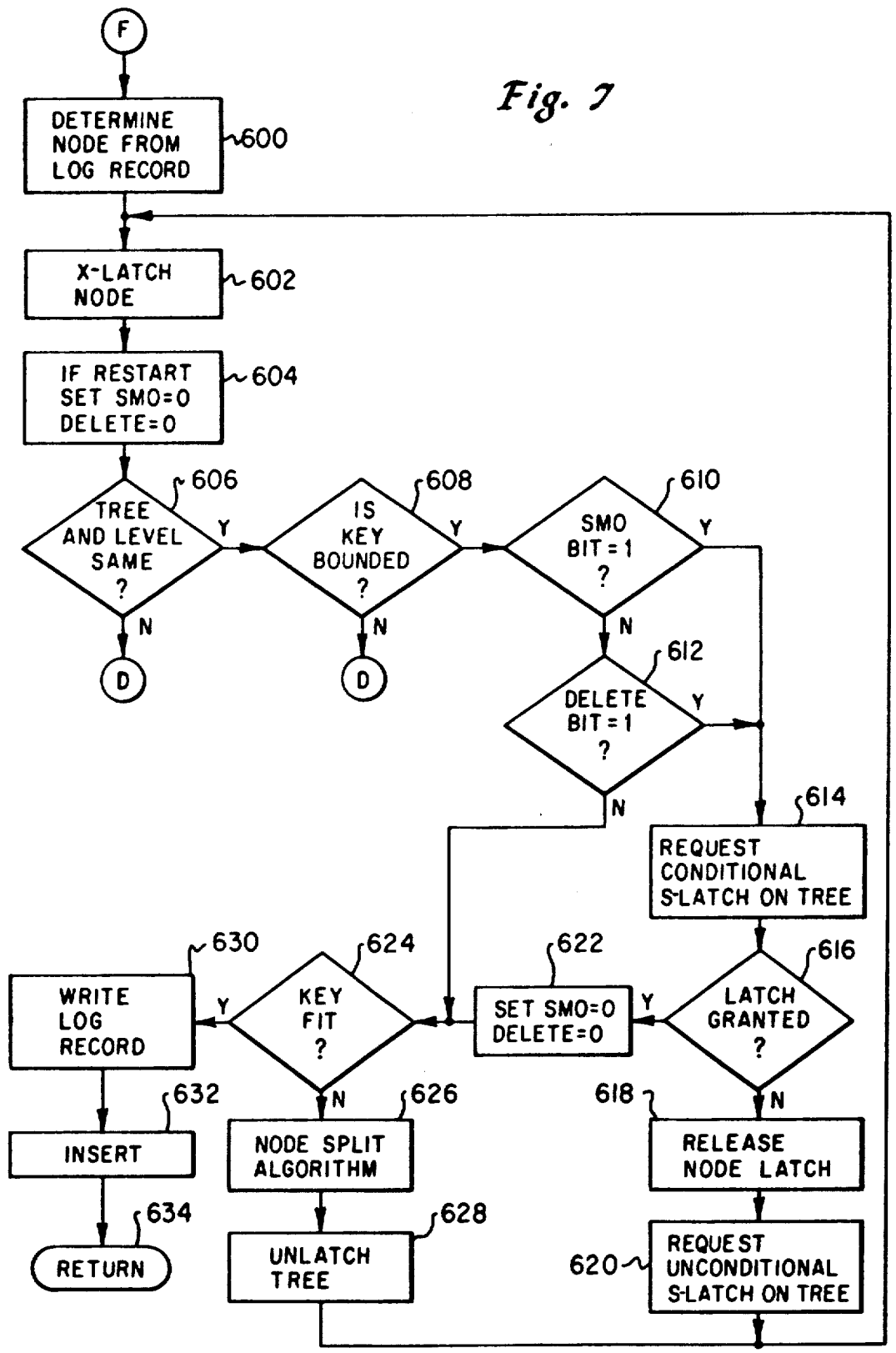
FIG. 7 is a logic flow diagram illustrating an NDO of a key record delete through a database in accordance with the present invention.

With reference now to FIG. 7, there is depicted a logic flow chart illustrating an UNDO of a key record delete in accordance with the present invention. Those skilled in the art will appreciate that in order to maintain an index tree at a point of consistency, it is periodically necessary to roll back or "UNDO" an operation which has not yet reached a new state of consistency in the event of a system failure or other error condition prior to completion. The UNDO of a key record delete will operate in much the same manner as a key record insert. As can be seen, the first step is the determination of the appropriate node from the log record which has been maintained in accordance with the log write-ahead protocol. This is illustrated in step 600. Next, step 602 indicates the X-latching of that node and step 604 illustrates the setting of the SMO bit and Delete bit equal to zero, if the UNDO is being accomplished as a result of a restart after a system failure.

Step 606 is utilized to determine whether or not the node is located within the same tree and at the same level as the situation prior to the cause of the UNDO and if not, the search procedure outlined in FIG. 2 is repeated. Next, step 608 illustrates the determination of whether or not the key to be deleted by the UNDO operation is bounded in the node. Again, if not, the search procedure outlined in FIG. 2 is repeated.

If the key to be deleted is bounded on the local node, step 610 determines whether or not the SMO bit is equal to one, indicating, as disclosed above, that the node in question is involved in a pending structure modification operation. If the SMO bit is not equal to one, step 612 determines whether or not the Delete bit is equal to one, determining whether or not the node in questions has recently had a record deleted in a transaction which has not yet reached a point of consistency.

If neither the SMO bit or Delete bit is equal to one, the program proceeds to step 624 to determine whether or not the key record to be inserted will fit in the appropriate node. Referring again to steps 610 and 612, if either the SMO bit is equal to one or the Delete bit is equal to one, step 614 represents the requesting of a conditional S-latch on the tree. Step 616 then determines whether or not the S-latch has been granted and if so, step 622 is utilized to set the SMO bit and Delete bit equal to zero before determining whether or not the key to be inserted will fit into the node as discussed with regard to step 624.

In the event that the conditional S-latch requested on the tree in step 614 is not granted, then step 618 depicts the releasing of the node latch and the requesting in step 620 of an unconditional S-latch on the tree. After an unconditional S-latch on the tree has been granted, the program returns to step 602 where the node is X-latched and the process begins again.

Referring again to step 624, if the key record to be inserted does not fit into the appropriate node, step 626 illustrates the calling of the node split algorithm. After the node split algorithm has been accomplished, step 628 depicts the unlatching of the tree and the program once again returns to step 602 to begin the procedure again. In the event that the key record to be inserted does fit into the appropriate node, step 630 illustrates the writing of a log record prior to accomplishing that insert in step 632. Thereafter, the program returns to the user in step 634.

Figure 8:
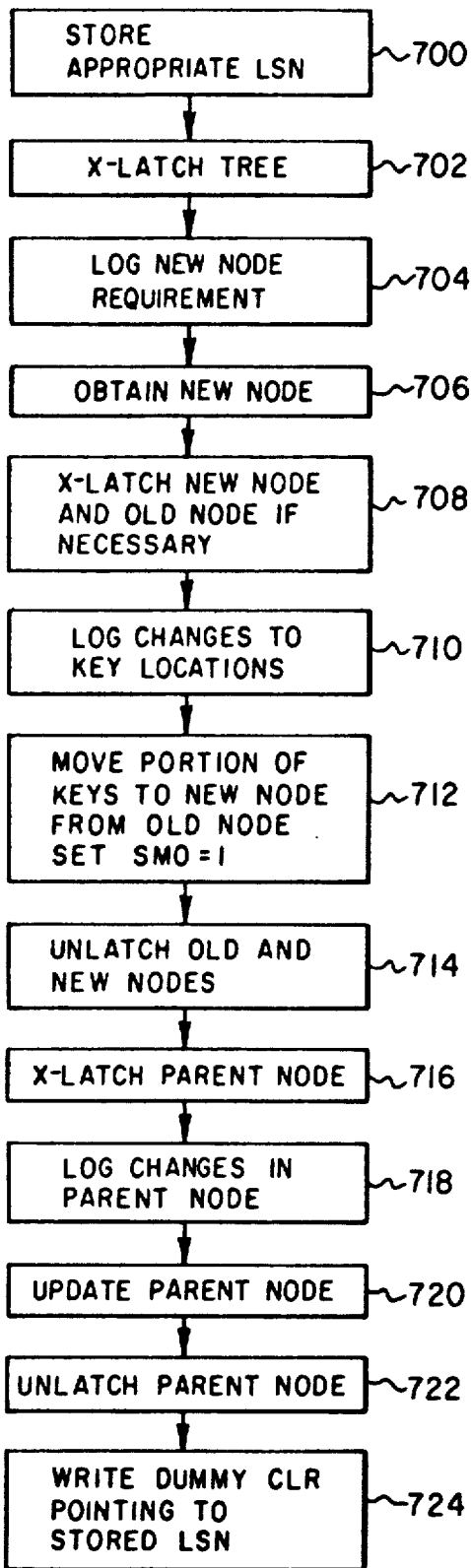
FIG. 8 is a logic flow chart illustrating a node splitting algorithm in accordance with the present invention.

With reference now to FIG. 8, there is depicted a logic flow chart illustrating a node splitting algorithm in accordance with the present invention. As can be seen, the node splitting algorithm begins by storing an appropriate log sequence number, which is associated with the operation which was accomplished just prior to the node splitting operation. Those skilled in the art will appreciate that in a forward propagating transaction this will be the log sequence number which was accomplished just prior to the node splitting algorithm; however, in an UNDO which requires a node splitting operation this log sequence number will be the log sequence number of the operation which occurred just after the operation in question.

Next the tree is X-latched as illustrated in step 702 and the new node requirement is logged in accordance with the log write-ahead protocol, as depicted in step 704. Step 706 is then utilized to obtain the new node and step 708 depicts the X-latching of the new node and the old node, if necessary. In step 710, in accordance with the log write-ahead protocol, the changes to the key locations are written to a log prior to the moving of a portion of the keys to a new node from the old node in step 712. Step 712 also sets the SMO bit equal to one in the leaf node affected so that concurrent users may determine that the node in question is involved in a structure modification operation which has not yet completed.

Next, the old and new nodes are unlatched as depicted in step 714 and the parent node is X-latched as illustrated in step 716. Any changes necessary in the parent node are then logged in step 718 and the parent node is updated in step 720. The parent node is then unlatched as depicted in step 722 and a dummy compensation log record (CLR) is written to the log memory which points to the stored appropriate log sequence number (LSN). Those skilled in the art will appreciate that a composition log record is a log which defines the place or point in time where an UNDO takes place, identifying how much and what is being UNDONE at that point in time. In this manner, the structure modification operation which has just been accomplished will not be undone despite the possible failure of the system prior to the transaction involved reaching a new point of consistency. If such a failure occurs, the dummy CLR record will cause the undoing algorithm to jump to the operation which occurred just prior to the beginning of the completion of the structure modification operation. Thus, any transaction involving a structure modification operation will be rolled back in its entirety if the structure modification operation has not been completed but will only be rolled back as to nonstructure modification operations if the structure modification operation has been completed prior to the system outage or transaction ABORT during normal processing. It should be noted that this will effectively prohibit the undoing of a structure modification which has been completed despite the failure of the transaction containing that structure modification to achieve a commit status. In this manner, a higher level of concurrency may be obtained due to the system's ability to commit to a structure modification without requiring transaction to achieve a commit state.

Figure 9:
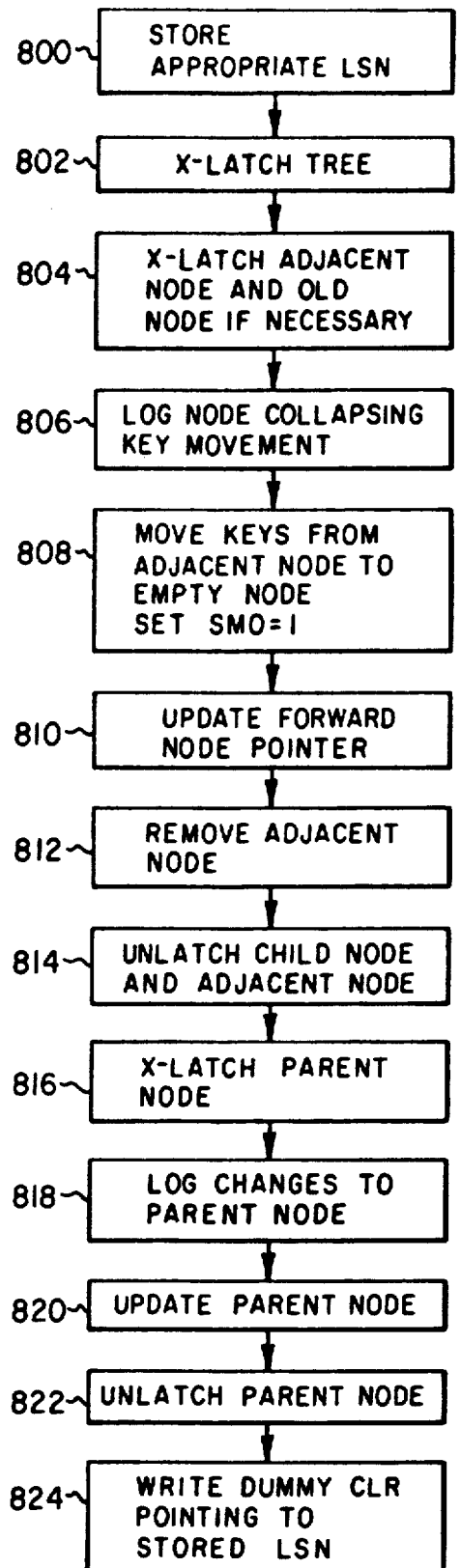
FIG. 9 is a logic flow chart illustrating a node collapsing algorithm in accordance with the present invention.

Finally now with reference to FIG. 9, there is depicted a logic flow chart illustrating a node collapsing algorithm in accordance with the present invention. As can be seen, in a manner similar to that depicted in the node splitting algorithm, the process begins with the storing of an appropriate log sequence number (LSN), in step 800. Next, the tree is X-latched in accordance with step 802 and the adjacent and old nodes are X-latched, if necessary, in accordance with step 804.

In accordance with the log write-ahead protocol previously discussed, the node collapsing key movement is logged in accordance with step 806 and step 808 depicts the moving of keys from the adjacent node to the empty node. Step 808 also depicts the setting of the SMO bit equal to one, indicating to concurrent users that a pending structure modification operation with regard to this particular node is in progress. Next, step 810 is utilized to update the forward node pointer, and step 812 is utilized to remove the adjacent node.

The child node and adjacent node are then unlatched in accordance with step 814 and the parent node is X-latched in accordance with step 816 prior to changing the parent node. Step 818 illustrates the logging of the changes to the parent node prior to accomplishing such changes in step 820. Thereafter, the parent node is unlatched in step 822 and a dummy compensation log record (CLR) is written which points to the stored appropriate log sequence number (LSN).

In both the node splitting and node collapsing algorithms previously described, those skilled in the art will appreciate that the SMO bit may be reset to zero at any time and in any appropriate manner after the structure modification operation has been completed. Upon reference to the foregoing, those skilled in the art will appreciate that the Applicants have provided a method and apparatus for concurrent modifications of an index tree in a transaction processing system which will accommodate a high degree of concurrency by permitting key record insertion and deletion to occur throughout the tree except in those areas of the tree in which a structure modification operation is pending.

Additionally, once the structure modification operation has been completed, a dummy compensation log record is utilized to ensure that the structure modification operation will not be undone despite a system outage prior to the transaction in question reaching a new point of consistency. In this manner, the physical consistency of the index tree is maintained and the high degree of concurrency resulting from this maintenance will enhance the utilization of the index tree by multiple concurrent users.

Similarly, the utilization of a flag bit within nodes where a deletion has recently occurred will delay a key record insertion which might otherwise be affected by a structure modification operation which occurs during an UNDO. Once the transaction incorporating the record deletion has reached a state of consistency, the Delete bit is once again set to zero and any key record insertions which have been delayed are permitted to progress.

Those skilled in this art will appreciate that while the operations described herein are generally referred to as occurring in a leaf node, such node split and node collapse operations will often cause similar operations to propagate up the tree toward the root node. It should be understood that the methods disclosed herein are equally applicable to such higher level operations.

While the invention has been particularly shown and described with reference to a preferred embodiment, it will be understood by those skilled in the art that various changes in form and detail may be made therein without departing from the spirit and scope of the invention.

We claim:

1. In a data processing system a method executed by a data processor for fetching a selected key record in a group of record keys by utilizing a portion of a key record through an index tree having a modifiable structure during a transaction in said data processing system wherein other transactions may concurrently modify the structure of said index tree, said index tree having at least a root node, each root node having a key record reference to one or more nodes in a next lower ordered level and having bottom nodes that provide access to said key record data in an ordered sequence of key records, said method comprising the steps performed within said data processing system of:
- traversing across said nodes within said data processing system from said root node by using key record reference until an appropriate bottom node is reached;
- identifying said selected key record in said bottom node;
- requesting a conditional access restriction on said selected key record;
- fetching said selected key record if said conditional access restriction is granted;
- requesting an unconditional access restriction of said selected key record if said conditional access restriction is not granted;
- examining said appropriate bottom node after said unconditional access restriction is granted to determine whether or note said appropriate bottom node has been substantially altered;
- fetching said selected key record is said appropriate bottom node has not been substantially altered; and
- traversing across said nodes from said root node by using said key record reference until a second appropriate bottom node is reached if said appropriate bottom node has been substantially altered.

2. The method according to claim 1, wherein said step of examining said appropriate bottom node after said unconditional access restriction has been granted to determine whether or not said appropriate bottom node has been substantially altered further includes the step of determining whether or not said selected key record is a first key record in said ordered sequence of key records within said appropriate bottom node.

3. The method of according to claim 1, wherein said step of examining said appropriate bottom node after said unconditional access restriction is granted to determine whether or not said appropriate bottom node has been substantially altered further includes the step of determining whether or not a next lower key record in said ordered sequence of key records within said appropriate bottom node is lower than said selected key record.

4. The method according to claim 1, wherein said step of examining said appropriate bottom node after said unconditional access restriction is granted to determine whether or not said appropriate bottom node has been substantially altered further includes the step of determining whether or not a key record exists in said appropriate bottom node which is lower than said selected key record.

5. In a data processing system a method executed by a data processor for inserting a single key record in a group of record keys according to a key record through an index tree having a modifiable structure during a transaction in said data processing system wherein other transactions may concurrently modify the structure of said index tree, said index tree having at least a root node, each root node having a key record reference to one or more nodes in a next lower ordered level and having bottom nodes that provide access to an ordered sequence of key records, said method comprising the steps performed within said data processing system of:
- traversing across said nodes within said data processing system from said root node by using said key record reference until an appropriate bottom node is reached;
- identifying a next higher key record than the single key record to be inserted;
- requesting a conditional access restriction on said next higher key record;
- inserting said single key record into said appropriate bottom node if said conditional access restriction is granted;
- requesting an unconditional access restriction on said next higher key record if said conditional access restriction is not granted;
- examining said appropriate bottom node after said unconditional access restriction is granted to determine whether or not said appropriate bottom node has been substantially altered;
- inserting said single key record into said appropriate bottom node if said appropriate bottom node has not been substantially altered; and
- traversing across said node from said root node by using said key record reference until a second appropriate bottom node is reached if said appropriate bottom node has been substantially altered.

6. The method according to claim 5, wherein said step of examining said appropriate bottom node after said unconditional access restriction is granted further includes the step of determining whether said single key record is bounded on said appropriate bottom node.

7. The method according to claim 5, wherein said step of examining said appropriate bottom node after said unconditional access restriction is granted further includes the step of determining whether said appropriate bottom node is participating in a structure modification operation which is not yet complete.

8. In a data processing system a method executed by a data processor for deleting a single key record in a group of record keys according to a key record through an index tree having a modifiable structure during a transaction in said data processing system wherein other transactions may concurrently modify the structure of said index tree, said index tree having at least a root node, each root node having a key record reference to one or more nodes in a next lower ordered level and having bottom nodes that provide access to an ordered sequence of record keys, said method comprising the steps performed within said data processing system of:
- traversing said nodes within said data processing system from said root node by using said key record reference until an appropriate bottom node is reached;

requesting a conditional access restriction on a next higher key record than the single key record to be deleted;

deleting said single key record from said appropriate bottom node if said conditional access restriction is granted;

requesting an unconditional access restriction on said next higher key record if said conditional access restriction is not granted;

examining said appropriate bottom node after said unconditional access restriction is granted to determine whether or not said appropriate bottom node has been substantially altered;

deleting said single key record from said appropriate bottom node if said appropriate bottom node has not been substantially altered; and traversing across said nodes from said root node by using said key record reference until a second appropriate bottom node is reached if said appropriate bottom node has been substantially altered.

9. The method according to claim 8, wherein said step of examining said appropriate bottom node after said unconditional access restriction is granted further includes the step of determining whether said appropriate bottom node is participating in a structure modification operation which is not yet complete.

10. A data processing system for fetching a selected key record in a group of record keys by utilizing a portion of a key record through an index tree having a modifiable structure during a transaction in said data processing system wherein other transactions may concurrently modify the structure of said index tree, said index tree having at least a root node, each root node having a key record reference to one or more nodes in a next lower ordered level and having bottom nodes that provide access to said key record data in an ordered sequence of key records, said data processing system comprising:

means for traversing across said nodes within said data processing system from said root node by using said key record reference until an appropriate bottom node is reached;

means for identifying said selected key record in said bottom node;

means for requesting a conditional access restriction on said selected key record;

means for fetching said selected key record if said conditional access restriction is granted;

means for requesting an unconditional access restriction of said selected key record if said conditional access restriction is not granted;

means for examining said appropriate bottom node after said unconditional access restriction is granted to determine whether or not said appropriate bottom node has been substantially altered;

means for fetching said selected key record if said appropriate bottom node has not been substantially altered; and means for traversing across said nodes from said root node by using said key record reference until a second appropriate bottom node is reached if said appropriate bottom node has been substantially altered.

11. The data processing system according to claim 10, wherein said means for examining said appropriate bottom node after said unconditional access restriction has been granted to determine whether or not said appropriate bottom node has been substantially altered further includes means for determining whether or not said selected key record is a first key record in said ordered sequence of key records within said appropriate bottom node.

12. The data processing system according to claim 10, wherein said means for examining said appropriate bottom node after said unconditional access restriction is granted to determine whether or not said appropriate bottom node has been substantially altered further includes means for determining whether or not a next lower key record in said ordered sequence of key records within said appropriate bottom node is lower than said selected key record.

13. The data processing system according to claim 10, wherein said means for examining said appropriate bottom node after said unconditional access restriction is granted to determine whether or not said appropriate bottom node has been substantially altered further includes means for determining whether or not a key record exists in said appropriate bottom node which is lower than said selected key record.

14. A data processing system for inserting a single key record in a group of record keys according to a key record through an index tree having a modifiable structure during a transaction in said data processing system wherein other transactions may concurrently modify the structure of said index tree, said index tree having at least a root node, each root node having a key record reference to one or more nodes in a next lowered ordered level and having bottom nodes that provide access to an ordered sequence of key records, said data processing system comprising:

means for traversing across said nodes within said data processing system from said root node by using said key record reference until an appropriate bottom node is reached;

means for identifying a next higher key record than the single key record to be inserted;

means for requesting a conditional access restriction on said next higher key record;

means for inserting said single key record into said appropriate bottom node if said conditional access restriction is granted;

means for requesting an unconditional access restriction on said next higher key record if said conditional access restriction is not granted;

means for examining said appropriate bottom node after said unconditional access restriction is granted to determine whether or not said appropriate bottom node has been substantially altered;

means for inserting said single key record into said appropriate bottom node if said appropriate bottom node has not been substantially altered; and means for traversing across said node from said root node by using said key record reference until a second appropriate bottom node is reached if said appropriate bottom node has been substantially altered.

15. The data processing system according to claim 14, wherein said means for examining said appropriate bottom node after said unconditional access restriction is granted further includes means for determining whether said single key record is bounded on said appropriate bottom node.

16. The data processing system according to claim 14, wherein said means for examining said appropriate bottom node after said unconditional access restriction is granted further includes means for determining whether said appropriate bottom node is participating in a structure modification operation which is not yet complete.

17. A data processing system for deleting a single key record in a group of record keys according to a key record through an index tree having a modifiable structure during a transaction in said data processing system wherein other transactions may concurrently modify the structure of said index tree, said index tree having at least a root node, each root node having a key record reference to one or more nodes in a next lower ordered level and having bottom nodes that provide access to an ordered sequence of record keys, said data processing system comprising:

means for traversing said nodes within said data processing system from said root node by using said key record reference until an appropriate bottom node is reached;

means for requesting a conditional access restriction on a next higher key record than the single key record to be deleted;

means for deleting said single key record from said appropriate bottom node if said conditional access restriction is granted;

means for requesting an unconditional access restriction on said next higher key record if said conditional access restriction is not granted;

means for examining said appropriate bottom node after said unconditional access restriction is granted to determine whether or not said appropriate bottom node has been substantially altered;

means for deleting said single key record from said appropriate bottom node if said appropriate bottom node has not been substantially altered; and means for traversing across said nodes from said root node by using said key record reference until a second appropriate bottom node is reached if said appropriate bottom node has been substantially altered.

18. A data processing system according to claim 17, wherein said means for examining said appropriate bottom node after said unconditional access restriction is granted further includes means for determining whether said appropriate bottom node is participating in a structure modification operation which is not yet complete.

* * * * *